3,120,000
RADIO DIRECTION FINDING SYSTEMS
Raymond M. Wilmotte, Princeton, N.J.
(4301 Massachusetts Ave. NW., Washington 16, D.C.)
Continuation of application Ser. No. 732,634, May 2, 1958. This application July 27, 1961, Ser. No. 127,403
12 Claims. (Cl. 343—113)

The present invention relates to radar or direction finding systems and in particular to systems of this type adapted to measure the direction of moving targets, and is a continuation of my copending application S.N. 732,634, filed May 2, 1958, now abandoned.

When radio waves are received from distant targets by a pair of spaced antennas, the waves arrive at one of the antennas at a time, $t$, later than they do at the other antenna. I have found that due to this time delay a target having a tangential component of velocity will cause the frequencies at the two antennas to differ by an amount dependent on the tangential velocity. This difference in frequency limits the time over which the received signals may be compared, or in which the signals may be integrated without a substantial change in phase during the period of integration.

It is an object of my invention to remove the difficulties arising from the frequency difference due to the tangential velocity of the target.

It is another object of my invention to remove the tangential velocity component from the signals and to measure this frequency in order to determine the value of the tangential velocity of the target.

The invention will be fully understood and other objects and advantages will become apparent from the following description and accompanying drawings in which.

Figure 1:
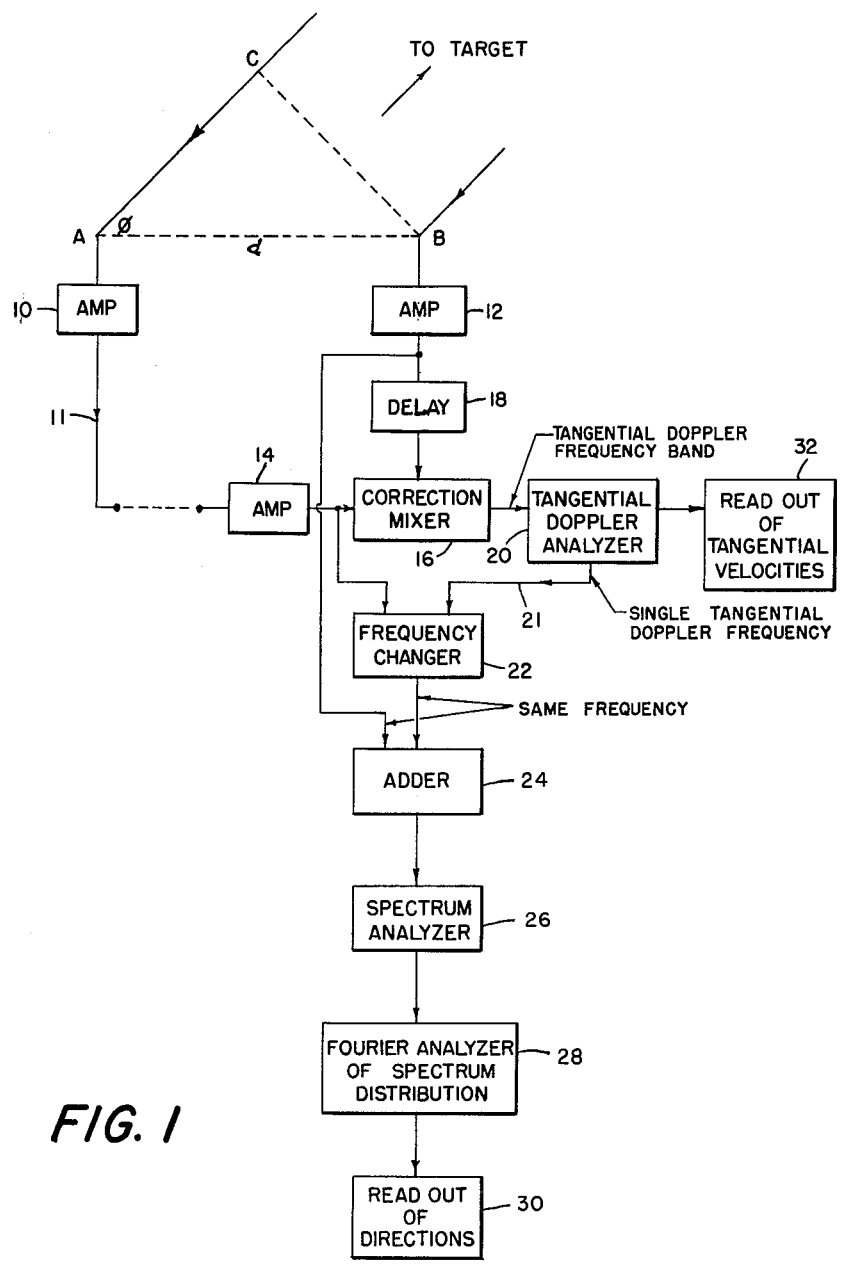
FIG. 1 is a block diagram of one embodiment of the invention.

The circuits shown in the drawings to be described below may be direction finding receivers or the receivers of radar systems. For the sake of simplicity, however, the transmitting portion of the radar system will not be described and other apparatus not necessary to an understanding of the invention will be omitted.

Referring to FIG. 1, the receiver is provided with a frequency sensitive antenna. The simplest form of such an antenna is a pair of spaced radiators A and B having a spacing $d$. It will be assumed that the target is at an angle $\phi$ and, therefore, the path to the antenna A is longer by a distance AC than the distance to the antenna B. Consequently, there is a time delay $t$ corresponding to the distance AC. Assume that the carrier frequency is $$\frac{\omega_0}{2\pi}$$

the distance to the target is D, and that the target has a tangential velocity relative to the receiver of a value $V_t$. Under these conditions a frequency difference exists between the signals received at antennas A and B, and this frequency difference is defined by the following equation:

$$\frac{d\Phi}{dt} = \omega_0 \frac{d}{D} \frac{V_t}{c} \sin \phi$$

The circuit of FIG. 1 shows how the above-mentioned frequency difference may be compensated to permit a more effective and accurate comparison of the signals received by the two antennas, and how this frequency may be isolated and measured to give the tangential velocity of the target. Signals from antennas A and B are fed through two amplifiers 10 and 12. The signal from amplifier 10 then passes over a line 11 to another suitable amplifier 14 and then to a mixer circuit 16. The signals from the amplifiers 12 are fed through a delay line 18 which may be adjusted to compensate for the difference in transmission time from antennas A and B to mixer 16. The output of mixer 16 is fed into a tangential Doppler frequency analyzer 20. This device, which will be described in more detail in connection with FIG. 2, selects the frequency due to the tangential velocity of the target. The output of the tangential Doppler frequency analyzer may be used to control an oscillator and provide a single tangential Doppler frequency which is then supplied over a connection 21 to a frequency changer 22. In frequency changer 22 the tangential velocity frequencies are added to signals from amplifier 14 so that the output of frequency changer 22 is of the same frequency as the output of amplifier 12, which is also supplied to the adder circuit 24. It can be seen, therefore, that at the input of adder circuit 24 the two input frequencies are substantially the same and the tangential velocity frequency B is essentially compensated. The output of the adder circuit is then fed to a spectrum analyzer 26.

The spectrum of the output of the adder circuit 24 will have a series of maxima and minima. It is clear that the antenna pair produces the equivalence of a frequency sensitive antenna, that is, one which has different radiation distribution patterns for different frequencies. The spectrum that will be obtained when the signals from the two antennas are added together will therefore be a function of the direction of the incident wave, that is, of the direction of the target. In order to establish that direction, it is, therefore, necessary to receive a wide frequency band and the wider the frequency pattern, the more information is available and, therefore, the more accurate will be the measurement of direction. The specific form of the spectrum in the particular case considered of two spaced antennas will comprise a series of maxima and minima, for the phase difference of a frequency received at antenna A and at B will depend on the number of electrical degrees of that particular frequency in the distance AC. If consecutive frequency elements of the frequency band are considered, it will be seen that this phase relationship will change and will, in general, change through several complete cycles. Each cycle will produce in the output of the spectrum analyzer one maximum and one minimum. The number of maxima and minima in the spectrum will, therefore, be proportional to the band width and will depend as stated above on the direction of arrival of a wave. The variations from maxima to minima will generally be sinusoidal. Should signals be received from several directions, each direction will produce a sinusoidal output at the spectrum analyzer, having a frequency characteristic of that direction. By making a Fourier analysis of the output of the spectrum analyzer, it will then be possible to separate the individual frequencies and thus establish the direction of each target individually.

The spectrum analyzer may be of the type which is capable of memorizing the spectrum so that the memorized spectrum may be scanned at intervals. The outputs produced by the scanning are fed into a Fourier analyzer 28 which determines the number of maxima and minima in the spectrum of the output of adder 24. From the number of maxima and minima a direct measurement of the direction $\phi$ can be obtained. The direction determined in this manner may be indicated by a direction indicator 30. The output of the tangential Doppler analyzer 20 may be measured in any suitable frequency measuring apparatus 32 to give an indication of the tangential velocity of the target.

Figure 2:
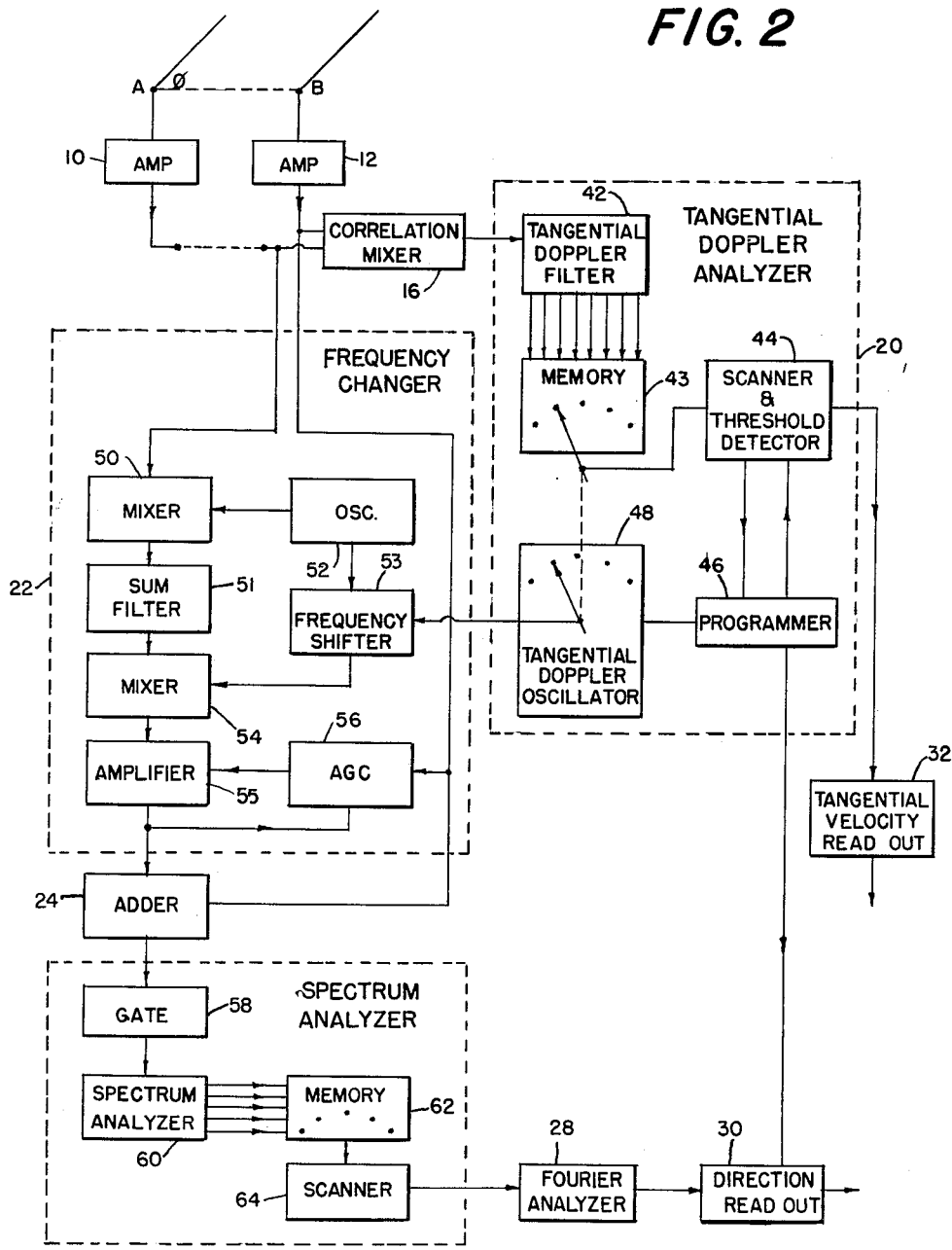
FIG. 2 is a block diagram of another embodiment of the invention.

FIG. 2 shows a more detailed block diagram of the system shown in FIG. 1. The signals are fed from antennas A and B through amplifiers 10 and 12 to the correlation mixer 16 and then to the tangential Doppler analyzer 20 in the same manner as in FIG. 1. Spectrum analyzer 20 consists of a large number of closely spaced filters 42. Each of the filters is coupled to a memory device 43 having a decay time which permits it to discharge to zero should the signal disappear. A scanner and threshold detector 44 reads the output of the memory device 43 by scanning the same. When the scanner 44 detects an output on one of the filters 42 it operates a programming apparatus 46 which stops the scanning process. Linked to the memory scanner 44 is a tangential Doppler oscillator 48. This oscillator changes its frequency with the scanning of the memory device 43 so that its frequency is at all times equal to the frequency of the filter being scanned. Therefore, should a signal appear to the output of the threshold detector 44 the scanning process will stop at that filter and the correct tangential Doppler frequency is then coupled from oscillator 44 to frequency changer 22.

The function of programmer 46 is as follows: After having established the required correspondence between the signal in a particular tangential Doppler filter 42 and the tangential Doppler oscillator frequency, the programming apparatus sets the tangential Doppler oscillator at that frequency for a short time. This allows accurate measurement of the direction of a target or jammer that has that particular velocity. The programmer then causes the scanning circuits to scan the rest of the filters for additional targets. Threshold circuit 44 also couples the scanned filter output to a read-out device 43. This device displays a signal which is proportional to the tangential velocity of the target to permit measurement of the tangential velocity.

Frequency changer 22 is designed to change the frequency of the signal from radiator A by the small amount of the tangential Doppler frequency provided by oscillator 48. This frequency change is produced by first heterodyning in mixer 50 the signal from antenna A with a suitable frequency F from oscillator 52 of some arbitrary value. The resultant signal is selected by a filter 51 and supplied to a mixer 54. The frequency F from oscillator 52 is also added in a frequency shifter 53 to the Doppler frequency supplied by oscillator 48. The output of frequency shifter 53 is then fed to mixer 54 which produces an output coresponding to the frequency difference of the two signals supplied thereto. The output of mixer 54 may be fed to an amplifier 55 which is provided with a gain control circuit 56. The signals from amplifier 55 are then combined with the signals from antenna B in adder circuit 24 in the same manner as in FIG. 1 and the combined signals are then supplied to the spectrum analyzer 26.

The output of frequency changer 22 has the same waveform and frequency and approximately the same amplitude as the signals from antenna B. There is a difference in time delay, however, depending on the direction of arrival of the signals. This time delay corresponds to the different phases between the signals in antennas A and B for each frequency of the frequency band and the result is that the output of adder 24 varies with frequency so that the output changes through a series of maxima and minima, the number of which are determined by the direction of the target. The signals from the adder circuit enter the spectrum analyzer 60 through a gating circuit 58. The spectrum analyzer 60 may consist of a large number of closely spaced filters. The outputs of these filters are supplied to a suitable memory device 62 which is scanned by a scanner 64 at suitable intervals which may be, say a sixth of a second. The output of the memary device is then analyzed into its component frequencies by a Fourier analyzer which is essentially another spectrum analyzer. From this analysis of the component frequencies, the angle of arrival of the signal can be directly determined.

What is claimed is:
1. Apparatus for determining the direction of a target or source of radio waves having a tangential velocity relative to said apparatus, comprising a pair of spaced antennas, signal transmission channels connected to said antennas, means for deriving oscillations having a frequency substantially equal to the tangential Doppler frequency of said radio waves, means connected to said Doppler frequency means and to one of said channels for changing the frequency of the radio waves in that channel by an amount substantially equal to the frequency difference of the signals at the two antennas resulting from the tangential velocity of the target, means for additively combining the signals of the two channels, and means for analyzing the waveform of the combined signals and determining the direction of the target.

2. Apparatus for determining the direction of a target or a source of radio waves having a tangential velocity relative to said apparatus, comprising a pair of spaced antennas, a mixer circuit connected to both antennas, filtering means connected to the output of the mixer circuit for deriving a single frequency corresponding to the tangential velocity Doppler frequency of the target, means for changing the frequency of the signals of one antenna by the amount of the tangential Doppler frequency, means for additively combining said changed frequency with the signals from the other antenna, a spectrum analyzer connected to said last named means for determining the frequency components of the combined signals of the two antennas, and means responsive to the spectrum analyzer for determining the direction of the received signals.

3. Apparatus for determining the direction of a target radiatiang radio waves having a wide frequency band, comprising a pair of spaced antennas, means for additively combining the signals received by said antennas, spectrum analyzing means connected to said last-named means for determining the frequency spectrum of the signals at the output of the combining means and means connected to the spectrum analyzing means and responsive to the maxima and minima of the spectrum for determining the direction of the target.

4. Direction finding apparatus comprising a plurality of spaced antennas, an adder circuit for additively combining the signals received by said antennas, spectrum analyzing means connected to said last-named means for determining the number of maxima and minima in the frequency spectrum of the additively combined signals, and means responsive to said spectrum analyzing means for determining the direction of one or more targets in accordance with the distribution of said maxima and minima.

5. Apparatus for determining the direction of one or more targets or sources of radio waves having a wide frequency band, comprising a plurality of spaced antennas each adapted to receive the radio waves from all said targets, means for additively combining the signals recevied by said antennas, means connected to the output of said last named means for determining the frequency spectrum of the additively combined signals and the maxima and minima of the frequency spectrum, and means responsive to said spectrum determining means for determining the direction of each of said targets.

6. Apparatus according to claim 5, wherein said spectrum determining means consists of a number of filters tuned to closely spaced frequencies, electrical storage means for storing the outputs of said filters, and means connected to said storage means for scanning said storage means and determining the component frequencies of the frequency distribution of the maxima and minima of the frequency spectrum and thereby determining the directions of each of said targets.

7. A method of determining a velocity component of an object, comprising sensing at two spaced points a radiated energy signal received from said object, analyzing the two sensed signals for a difference in Doppler frequency, and providing a signal indicative of said difference in Doppler frequency, thereby indicating the tangential velocity of said object relative to said two spaced points, and further determining the bearing of said object from said two spaced points by changing the frequency of one of said two sensed signals by said Doppler frequency difference between the two signals, and then analyzing the other of said two sensed signals and the signal of changed frequency to determine the difference in time between receipt of the radiant energy signal at one of said two spaced points and receipt at the other of said two spaced points.

8. A method as set forth in claim 7, wherein said radiated energy signal is a radio signal.

9. Apparatus for determining the direction of an object, comprising two spaced means for sensing a radiated energy signal received from said object, means for analyzing the two sensed signals for determining the difference in Doppler frequency of the two sensed signals arising from any tangential velocity of the object relative to said two spaced means, means for changing the frequency of one of said sensed signals by said Doppler frequency difference to produce a resultant signal, and means for analyzing said resultant signal and the other of said two sensed signals to determine the difference in time between receipt of the radiated energy signal at one of said two sensing means and receipt at the other of said two sensing means.

10. An apparatus as set forth in claim 9, wherein said radiated energy signal is a radio signal, and said two spaced means include two spaced radio antennae.

11. A method of determining the bearing of an object, comprising sensing at two spaced points a radiated energy signal received from said object, analyzing the two sensed signals for a difference in Doppler frequency, changing the frequency of the signal sensed at one of said two spaced points by said Doppler frequency difference, and then analyzing the signal sensed at the other of said two spaced points and the signal of changed frequency to determine the difference in time between receipt of the radiant energy signal at one of said two spaced points and receipt at the other of said two spaced points.

12. A method as set forth in claim 11, wherein said radiated energy signal is a radio signal.

References Cited in the file of this patent

UNITED STATES PATENTS

| | | |
|---|---|---|
| 1,562,485 | Affel | Nov. 24, 1925 |
| 2,840,812 | Di Giacomo | June 24, 1958 |
| 2,968,034 | Cafarelli | Jan. 10, 1961 |

OTHER REFERENCES

Q.S.T., July 1956, pp. 38–41, vol. 40, No. 7.